United States Patent
Watanabe et al.

(10) Patent No.: US 6,742,634 B2
(45) Date of Patent: Jun. 1, 2004

(54) MAGNETIC BRAKE SYSTEM AND ELEVATOR TROUBLE DETECTION SYSTEM

(75) Inventors: Yasushi Watanabe, Tokyo (JP); Hiroshi Kiyosugi, Tokyo (JP); Mikio Nakai, Tokyo (JP); Yuki Ishida, Tokyo (JP); Toshiaki Matsuo, Tokyo (JP); Takashi Sekiya, Tokyo (JP)

(73) Assignee: Hitachi Building Systems Co., Ltd., Tokyo (JP)

( * ) Notice: Subject to any disclaimer, the term of this patent is extended or adjusted under 35 U.S.C. 154(b) by 0 days.

(21) Appl. No.: 10/315,225

(22) Filed: Dec. 10, 2002

(65) Prior Publication Data

US 2003/0111306 A1 Jun. 19, 2003

(30) Foreign Application Priority Data

Dec. 11, 2001 (JP) .................. 2001-377403
Jun. 6, 2002 (JP) .................. 2002-166110

(51) Int. Cl.$^7$ ............................ B60T 13/04
(52) U.S. Cl. ....................... 188/171; 188/163
(58) Field of Search ................. 188/79.52, 171, 188/163, 162, 161, 367, 1.11 E, 1.11 R (56) References Cited

U.S. PATENT DOCUMENTS 5,154,261 A * 10/1992 Tanaka et al. .............. 188/171
5,274,290 A * 12/1993 Fischer .......................... 310/93
5,490,584 A * 2/1996 Estaque et al. ............. 188/164
6,095,289 A * 8/2000 Ray et al. ................ 188/1.11 E
6,237,730 B1 * 5/2001 Dropmann et al. .......... 188/171
6,615,954 B2 * 9/2003 Wirth et al. ............ 188/1.11 R

* cited by examiner

*Primary Examiner*—Jack Lavinder
*Assistant Examiner*—Melanie Torres
(74) *Attorney, Agent, or Firm*—Crowell & Moring LLP (57) ABSTRACT

To accurately detect a trouble of a magnetic brake (2) by eliminating any effect of a temperature of a location at which an elevator is installed, a temperature sensor (3) is arranged to measure a temperature of the magnetic brake (2). When an armature (2c) has been attracted responsive to a brake release command, the temperature of the magnetic brake is measured as a first temperature, and before the armature returns responsive to a brake actuation command, the temperature of the magnetic brake is measured as a second temperature. The first and second temperatures are compared with each other. When a result of the comparison between the first and second temperatures is determined to be greater than a predetermined value, the magnetic brake (2) is determined to have been locked and hence, to have developed a trouble.

4 Claims, 8 Drawing Sheets

L3: BRAKE TEMPERATURE
L4: ELEVATOR RUNNING SIGNAL
T4: PREDETERMINED TIME AFTER BRAKE ACTUATION
T5: BRAKE TEMPERATURE DROP ABNORMALITY CRITERION

MAGNETIC BRAKE SYSTEM AND ELEVATOR TROUBLE DETECTION SYSTEM

TECHNICAL FIELD

This invention relates to a magnetic brake system capable of detecting a trouble of a magnetic brake controlled by an electric current fed through a coil, and also to an elevator trouble detection system using the above magnetic brake system as an elevator drive motor.

BACKGROUND ART

As a brake for an elevator, a magnetic brake is generally used. This magnetic brake is constructed such that feeding of an electric current through a coil attracts an armature to separate a lining from a disc for permitting running of a car and cut-off of the electric current causes the armature to return to bring the lining into contact with the disc for applying braking force.

A magnetic brake of such a construction may be locked for various reasons so that the above-mentioned attraction of an armature may be troubled. As occurrence of such a trouble leads to a loss of normal braking force, a serious accident may take place. It is, therefore, required to detect a trouble of a magnetic brake without failure.

As disclosed in JP-A-11222371, for example, it has conventionally been proposed to measure the temperature of the lining by a temperature sensor and, when the measurement value is higher than a criterion, to determine that the gap between the lining and the disc is not normal and abnormal frictional heat is being produced, and to transmit trouble information to a supervision center by which an elevator is supervised at a remote location.

In the above-mentioned conventional art, the determination of a trouble in the magnetic brake is performed based on a comparison between the temperature measured by the temperature sensor and the criterion. However, the air temperature of a location at which an elevator is installed varies depending upon the geographical location or the season, so that measurement values obtained by the temperature sensor also deviate due to variations in air temperature. For accurate detection of a trouble, it is, therefore, necessary to adjust the criterion depending upon the geographical location or the season. However, irksome labor is required for resetting the criterion. Further, a magnetic brake is structurally arranged adjacent an elevator drive motor. Heat produced by the motor is hence transferred to the magnetic brake, leading to a rise in the temperature of the magnetic brake. Depending upon the installation site of an elevator, however, the operation rate of the elevator varies and the quantity of heat produced by its motor also differs. It is, therefore, also necessary to take into consideration the heat to be transferred from the motor upon setting the above-described criterion.

With the foregoing circumstances of the conventional art in view, the present invention has as primary objects thereof the provision of a magnetic brake system capable of detecting a trouble with accuracy and an elevator trouble detection system making use of the magnetic brake system.

DISCLOSURE OF THE INVENTION

To achieve these objects, the present invention, in a first aspect thereof, provides a magnetic brake system for performing braking action by cancellation of energization of a coil, said magnetic brake system comprising a magnetic brake provided with a disc connected to a shaft of a motor and also with an armature responsive to energization of the coil for being attracted to separate the disc from a lining, wherein the magnetic brake system comprises: a temperature detection means for detecting a temperature of the magnetic brake; a temperature comparison means for comparing a first temperature, which is detected by the temperature detection means when the coil is energized to release the magnetic brake, specifically, shortly after the coil is energized to release the magnetic brake, with a second temperature which is detected by the temperature detection means shortly when the energization of the coil is cancelled, specifically, shortly before the energization of the coil is cancelled to actuate the magnetic brake; and a control means for determining on a basis of a result of the comparison by the temperature comparison means whether or not the magnetic brake has developed any trouble.

The present invention, in a second aspect thereof, provides a magnetic brake system for performing braking action by, said magnetic brake system comprising a magnetic brake provided with a disc connected to a shaft of a motor and also with an armature responsive to energization of the coil for being attracted to separate the disc from a lining, wherein the magnetic brake system comprises: a temperature detection means for detecting a temperature of the magnetic brake; a temperature comparison means for comparing a first temperature, which is detected by the temperature detection means shortly before the energization of the coil is cancelled to actuate the magnetic brake, with a second temperature which is detected by the temperature detection means after a predetermined time is elapsed in continuous actuation of the magnetic brake over the predetermined time since the actuation of the magnetic brake; and a control means for determining on a basis of results of the comparison by the temperature comparison means whether or not the magnetic brake has developed any trouble.

The present invention, in a third aspect thereof, provides a magnetic brake system for performing braking action by cancellation of energization of a coil, said magnetic brake system comprising a magnetic brake provided with a disc connected to a shaft of a motor and also with an armature responsive to energization of the coil for being attracted to separate the disc from a lining, wherein the magnetic brake system comprises: a first temperature detection means for detecting a temperature of the magnetic brake; a second temperature detection means for detecting an air temperature of an environment in which the magnetic brake is installed; a temperature comparison means for comparing a first temperature, which is detected by the first temperature detection means, with a second temperature detected by the second temperature detection means; and a control means for determining on a basis of a result of the comparison by the temperature comparison means whether or not the magnetic brake has developed any trouble.

The present invention, in a fourth aspect thereof, provides a magnetic brake system as described above in connection with the first or third aspect, wherein, when a temperature difference between the first temperature and the second temperature as determined by the temperature comparison means is greater than a predetermined value, the control means determines that the magnetic brake has developed a trouble.

The present invention, in a fifth aspect thereof, provides a magnetic brake system as described above in connection with any one of the first to fourth aspects, further comprising an informing means for informing that the magnetic brake has developed the trouble, wherein, when the magnetic brake is determined to have developed the trouble, the control means informs accordingly by the informing means.

The present invention, in a sixth aspect thereof, provides an elevator trouble detection system for detecting a trouble of a magnetic brake for a drive motor of an elevator, said magnetic brake being provided with an armature attractable by energization of a coil in response to a brake release command to separate a lining from a disc for permitting running of a car and returnable by cancellation of the energization in response to a brake actuation command to bring the lining into contact with the disc for applying braking force, wherein the elevator trouble detection system comprises: a temperature detection means for detecting a temperature of the magnetic brake; a temperature comparison means for comparing a first temperature, which is detected by the temperature detection means when the armature has been attracted responsive to the brake release command, with a second temperature which is detected before the armature returns responsive to the brake actuation command; and a control means for determining on a basis of a result of the comparison by the temperature comparison means whether or not the magnetic brake has developed any trouble.

The present invention, in a seventh aspect thereof, provides an elevator trouble detection system for detecting a trouble of a similar magnetic brake as described above in the preamble of the sixth aspect, wherein the elevator trouble detection system comprises: a temperature detection means for detecting a temperature of the magnetic brake; a temperature comparison means for comparing a first temperature, which is detected by the temperature detection means before the armature returns responsive to the brake actuation command, with a second temperature which is detected by the temperature detection means after a predetermined time is elapsed when braking force is continuously applied for the predetermined time since the return of the armature in response to the brake actuation command; and a control means for determining on a basis of a result of the comparison by the temperature comparison means whether or not the magnetic brake has developed any trouble.

The present invention, in an eighth aspect thereof, provides an elevator trouble detection system for detecting a trouble of a similar magnetic brake as described above in the preamble of the sixth aspect, wherein the elevator trouble detection system comprises: a first temperature detection means for detecting a temperature of the magnetic brake; a second temperature detection means for detecting an air temperature of a location at which the elevator is installed; a temperature comparison means for comparing a first temperature, which is detected by the first temperature detection means, with a second temperature detected by the second temperature detection means; and a control means for determining on a basis of a result of the comparison by the temperature comparison means whether or not the magnetic brake has developed any trouble.

The present invention, in a ninth aspect thereof, provides an elevator trouble detection system for detecting a trouble of a similar magnetic brake as described above in the preamble of the sixth aspect, wherein the elevator trouble detection system comprises: a temperature detection means attached to one of components of the magnetic brake for detecting temperatures of the magnetic brake at predetermined intervals during a period of at least one day; a memory means for storing temperatures detected by the temperature detection means; and a control means for determining that, when a temperature rise from a lowest temperature as detected by the temperature detection means has exceeded a predetermined value, the magnetic brake has developed a trouble.

The present invention, in a tenth aspect thereof, provides an elevator trouble detection system as described above in connection with the ninth aspect, wherein the control means calculates an average daily temperature rise from a difference between a highest temperature and a lowest temperature stored in the memory means during a predetermined period of time, and sets the average daily temperature rise as the predetermined value.

The present invention, in an eleventh aspect thereof, provides an elevator trouble detection system for detecting a trouble of a similar magnetic brake as described above in the preamble of the sixth aspect, wherein the elevator trouble detection system comprises: a temperature detection means for measuring a temperature of the magnetic brake; a temperature comparison means for forcedly operating the elevator continuously for a predetermined time and comparing a first temperature, which is measured by the temperature detection means before initiation of the operation, with a second temperature which is measured by the temperature detection means after the operation; and a control means for determining on a basis of a result of the comparison by the temperature comparison means whether or not the magnetic brake has developed any trouble.

The present invention, in a twelfth aspect thereof, provides an elevator trouble detection system as described above in connection with the sixth, eighth or eleventh aspect, wherein, when a temperature difference between the first and second temperatures as determined by the comparison means is greater than a predetermined value, the control means determines that the magnetic brake has developed a trouble.

The present invention, in a thirteenth aspect thereof, provides an elevator trouble detection system as described above in connection with any one of the sixth to twelfth aspects, further comprising a communication means for making a communication to a supervision center, wherein, when the magnetic brake is determined to have developed a trouble, the control means transmits trouble information to the supervision center via the communication means.

In the first aspect, the temperature detection means arranged, for example, on the magnetic brake measures a first temperature shortly after the coil is energized to attract the armature, and also a second temperature when the energization of the coil is cancelled, in other words, shortly before an armature returns. The temperature comparison means compares the first temperature with the second temperature, and on the basis of a result of this comparison, determines whether or not the magnetic brake has developed any trouble. Described specifically, the temperature comparison means performs a comparison between the temperatures of the magnetic brake at two timings before and after the magnetic brake is actuated and the lining is not in contact with the disc when the magnetic brake is in order. If the magnetic brake is locked, the temperature of the magnetic brake becomes higher due to frictional heat, thereby permitting easy detection of the trouble.

As the air temperature of the location at which the magnetic brake is installed equally affects the measurement of the first temperature and the measurement of the second temperature, any effect of the air temperature itself on the determination can be ignored. Accordingly, a trouble of the magnetic brake can be detected with high accuracy. As a magnetic brake is often used as a brake for a power system in general, the air temperature may be considered to affect the determination of existence or non-existence of a trouble. Any effect of the air temperature itself on the determination can, however, be ignored because the air temperature of the location at which the elevator is installed equally affects the measurement of the first temperature and that of the second temperature.

In the second aspect, the temperature detection means arranged, for example, on the magnetic brake measures a first temperature shortly before energization of the coil is cancelled to actuate the magnetic brake and also a second temperature after a predetermined time is elapsed in continuous actuation of the magnetic brake for the predetermined time since the actuation of the magnetic brake. The temperature comparison means compares the first temperature with the second temperature, and on the basis of a result of the comparison, determines whether or not the magnetic brake has developed any trouble. If the magnetic brake is locked, a temperature arisen due to frictional heat becomes lower after an elapse of the predetermined time, thereby permitting accurate detection of the trouble.

In the third aspect, the air temperature is detected by the second temperature detection means, whereas the temperature of the magnetic brake is detected by the first temperature detection means. The temperature comparison means compares these temperatures with each other, and on the basis of a result of the comparison, the control means determines whether or not the magnetic brake has developed any trouble. As the control means makes the determination on the basis of a result of arithmetic on the measurement value of the first temperature detection means and the measurement value of the second temperature detection means, it is possible to cope with variations in the air temperature and to detect a trouble of the magnetic brake with high accuracy.

In the fourth aspect, the control means determines that the magnetic brake has developed a trouble, when as a result of the comparison by the temperature comparison means, the temperature difference between the first temperature and the second temperature is found to be greater than the predetermined value. As this trouble of the magnetic brake usually takes place as a result of occurrence of locking between the lining and the disc, the magnetic brake is determined to be locked when the temperature difference is greater than the predetermined value.

In the fifth aspect, when the magnetic brake is determined by the control means to have developed a trouble, the informing means informs accordingly. The occurrence of the trouble in the magnetic brake can, therefore, be promptly brought to the supervisor's attention, thereby permitting a prompt countermeasure to the trouble of the magnetic brake.

In the sixth aspect, a first temperature is measured when the armature has been attracted responsive to a brake release command, and a second temperature is measured before the armature returns responsive to a brake actuation command. Then, the first temperature and the second temperatures are compared with each other by the temperature comparison means, and on the basis of a result of the comparison, it is determined by the control means whether or not the magnetic brake has developed any trouble. This determination is performed as in the twelfth aspect. When a value obtained as a result of the comparison is not greater than a predetermined value, in other words, when no locking exists between the lining and the disc and no temperature rise has taken place, the magnetic brake is determined to be in order. If the value obtained as the result of the comparison is greater than the predetermined value, on the other hand, the magnetic brake is determined to be locked. As appreciated from the foregoing, the detection of locking is effected by a comparison between the first temperature and the second temperature. As the air temperature of the location at which the elevator is installed equally affects the measurement of the first temperature and that of the second temperature, any effect of the air temperature itself on the determination can be ignored. Accordingly, a trouble of the magnetic brake can be detected with high accuracy.

In the seventh aspect, a first temperature is measured before the armature returns responsive to the brake actuation command, and further, a second temperature is measured after a predetermined time is elapsed when braking force is continuously applied for the predetermined time since the return of the armature in response to the brake actuation command. The temperature comparison means compares the first temperature with the second temperature, and on the basis of a result of the comparison, the control means determines whether or not the magnetic brake has developed any trouble. If the magnetic brake is locked, a temperature arisen due to frictional heat becomes lower after an elapse of a predetermined time, thereby permitting accurate detection of the trouble.

In the eighth aspect, the second temperature detection means measures the air temperature of the location at which the elevator is installed, while the first temperature detection means measures the temperature of the magnetic brake while the car is running. The measurement value of the second temperature detection means and that of the first temperature detection means are then compared with each other by the temperature comparison means, and on the basis of a result of the comparison by the temperature comparison means, the control means determined whether or not the magnetic brake has developed a trouble. This determination is performed as in the twelfth aspect. When a value obtained as a result of the comparison is not greater than a predetermined value, it is determined that the magnetic brake is in order without locking between the lining and the disc. When the value obtained as the result of the comparison is greater than the predetermined value, on the other hand, the magnetic brake is determined to be locked. Because the detection of locking is effected on the basis of a result of arithmetic on a measurement value of a temperature sensor and a measurement value of an air temperature sensor as described above, it is possible to cope with variations in air temperature. Accordingly, a trouble of the magnetic brake can be detected with high accuracy.

In the ninth aspect, temperatures of the magnetic brake are measured by the temperature detection means at predetermined intervals during a period of at least one day. The thus-detected temperatures of the magnetic brake are stored in the memory means. When a temperature rise from the lowest temperature among the temperatures of the magnetic brake so stored has exceeded the predetermined value, the control means determines that operation of the magnetic brake is in a troubled state. A temperature rise of the magnetic brake in a normal state is attributed to the external air temperature and also to the transfer of heat from the elevator drive motor. Since temperature rises from the lowest temperature in a day due to the external air temperature and the transfer of heat from the motor are considered to be substantially constant, these temperatures do not exceed a predetermined criterion. If the magnetic brake is brought into a locked state, however, abnormal frictional heat is produced. A temperature rise from the lowest temperature of the magnetic brake, therefore, exceeds the predetermined criterion. It is, therefore, possible to accurately detect a trouble of the magnetic brake without being affected by the geographical location and season at and in which the external air temperature varies, or by the elevator operation rate that varies depending upon the installation site.

In the tenth aspect, an average daily temperature rise during a predetermined period of time is calculated from the difference between a highest temperature and a lowest temperature of the magnetic brake upon operation of the elevator, and this average daily temperature raise is set as the predetermined criterion. This makes it possible to automatically obtain, during operation of the elevator, a criterion which is in conformity with its specific installation site.

In the eleventh aspect, a first temperature is measured before the elevator is forcedly operated continuously, and a second temperature is measured after the operation of the elevator. The first temperature and the second temperature are compared with each other, and the determination is performed as in the sixth or eighth aspect. As understood from the foregoing, the detection of locking is performed by the comparison between the first temperature and the second temperature. As the measurements of the first and second temperatures are conducted before and after the initiation of the forced continuous operation, respectively, a trouble of the magnetic brake can be accurately detected without being affected by the elevator operation rate which differs depending upon the installation site.

In the twelfth aspect, the determination is performed as in the fourth aspect.

In the thirteenth aspect, the control means transmits trouble information to the supervision center via the communication means when the magnetic brake is determined to have developed a trouble. The occurrence of the trouble in the magnetic brake can be promptly found on the side of a control sensor (the supervision center) of the elevator, thereby permitting a prompt countermeasure to the trouble of the magnetic brake.

BEST MODES FOR CARRYING OUT THE INVENTION

Embodiments of the present invention will hereinafter be described with reference to the accompanying drawings. In the following embodiments, like elements and units will be identified by like reference signs or numerals, and overlapping descriptions will be omitted wherever appropriate.

<First embodiment>

Figure 1:
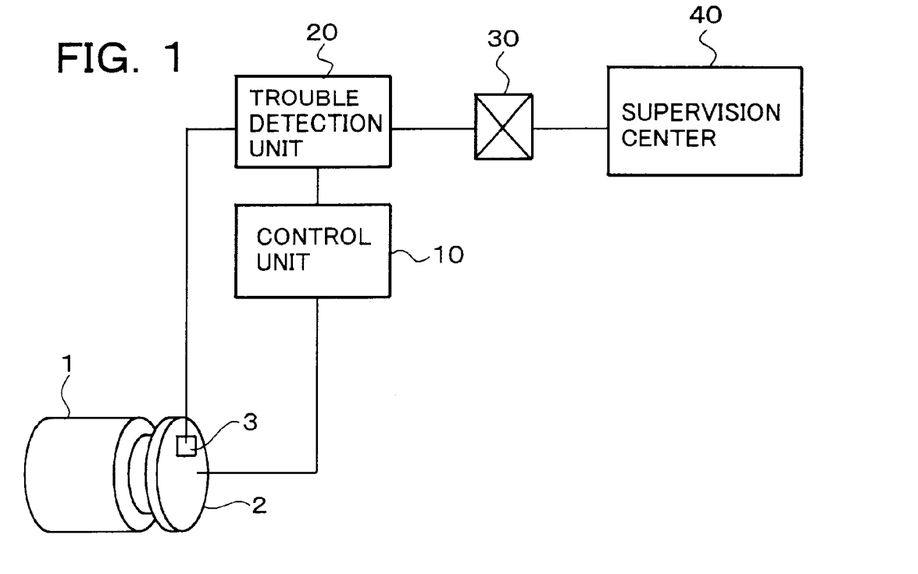
FIG. 1 is a block diagram of an elevator trouble detection system according to a first embodiment of the present invention.
Figure 2:
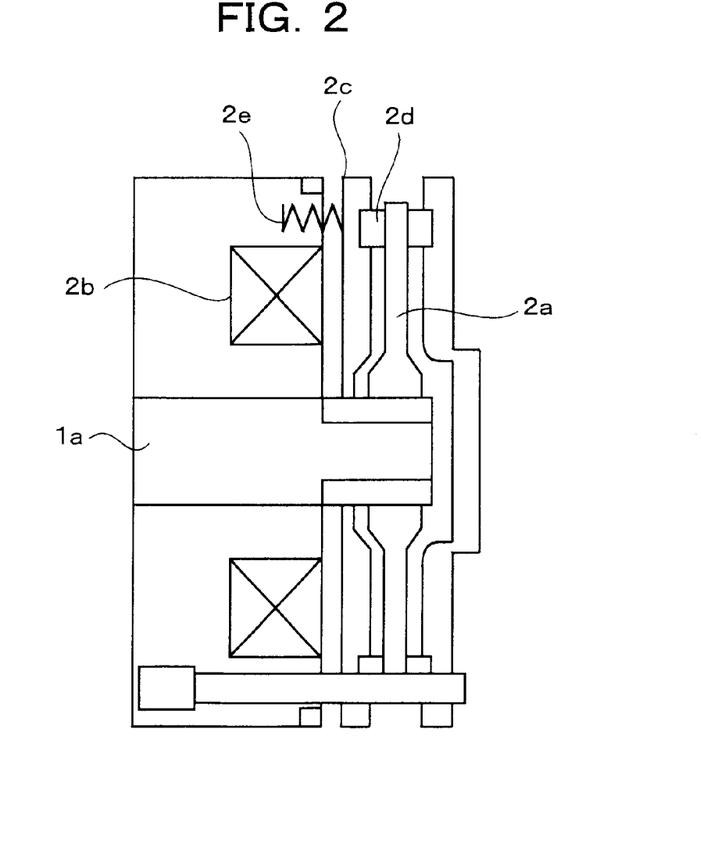
FIG. 2 is a schematic diagram of a magnetic brake to be arranged on an elevator, to which the elevator trouble detection system is applicable.
Figure 3:
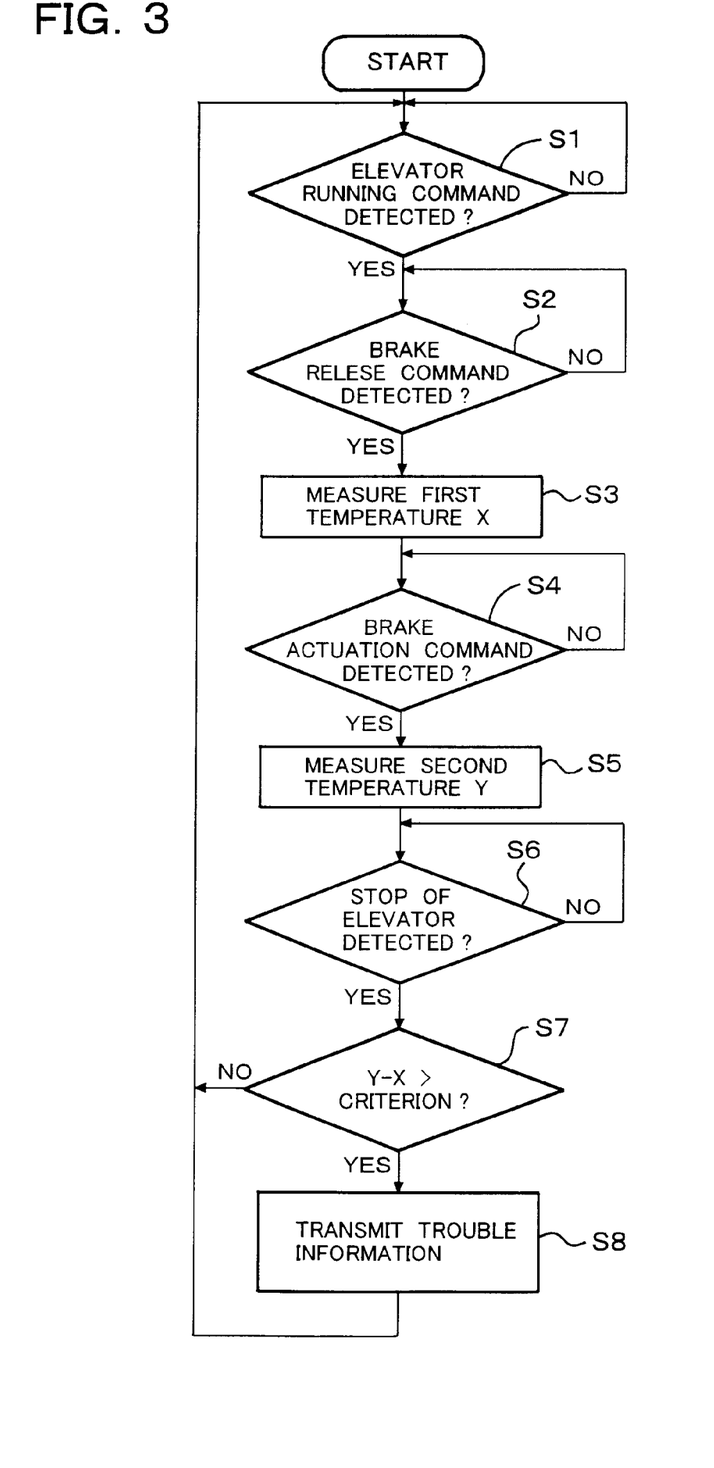
FIG. 3 is a flow chart showing a procedure for the detection of a trouble in the trouble detection system of FIG. 1.

Referring to FIG. 1, FIG. 2 and FIG. 3, the elevator trouble detection system according to the first embodiment of the present invention, the magnetic brake arranged on the elevator and the procedure of an operation by the trouble detection system of FIG. 1 will hereinafter be described, respectively.

As illustrated in FIG. 1, an elevator generally causes an unillustrated car to ascend or descend by drive force applied from a motor 1, and by a magnetic brake 2 attached to the motor 1, braking force is applied to stop the car. These motor 1 and magnetic brake 2 are controlled by a control unit 10.

In the first embodiment, a trouble detection unit 20 is connected to the control unit 10, is provided with a temperature sensor 3 as a temperature detection means for measuring a temperature of the magnetic brake 2, and is connected to a supervision center 40 via public lines 30 as a communication means.

As shown in FIG. 2, the magnetic brake 2 is provided with a disc 2a connected to a shaft 1a of the motor 1 and rotatable integrally with the shaft 1a, an armature 2c attractable responsive to energization of a coil 2b, a lining 2d movable in a direction away from the disc 2a upon attraction of the armature 2c, and a brake spring 2e for applying return force to the armature 2c. When the coil 2b is energized, the coil 2b produces attractive force greater than the resilient force of the brake spring 2e, and attracts the armature 2c so that the lining 2d is caused to separate from the disc 2a. As a result, the disc 2a and the shaft 1a are rendered free to permit running of the car. When the energization of the coil 2b is cancelled, on the other hand, the attractive force for the armature 2c is released so that the armature 2c returns under the resilient force of the brake spring 2e. As a consequence, the lining 2d is brought into contact with the disc 2c to produce braking force.

With reference to FIG. 3, a description will next be made about a procedure for the detection of a trouble by the first embodiment. The trouble detection unit 20 detects an elevator running command, which responsive to a call registration by a user, is outputted from the control unit 10 to cause the car to run (step S1). Upon detection of a brake release command outputted from the control unit 10 (step S2), a first temperature X is measured by the temperature sensor 3, and this first temperature X is stored (step S3). In other words, a temperature at the time that the armature 2c has been attracted responsive to the brake release command is stored. Next, upon detection of a brake actuation command outputted from the control unit 10 to stop the car (step S4), a second temperature Y is measured by the temperature sensor 3, and this second temperature Y is stored (step S5). In other words, a second temperature Y before the armature 2c returns responsive to the brake actuation command is measured and stored. The first temperature X is a temperature shortly after the brake has been released, whereas the second temperature Y is a temperature shortly before the brake actuates.

The armature 2c then returns such that the lining 2d is brought into contact with the disc 2a. Upon detection of a stop of the car (step S6), the first temperature X and the second temperature Y are compared with each other in an unillustrated comparator circuit as a comparison means within the trouble detection unit 20 (step S7). If a value (Y-X) obtained as a result of this comparison is not greater than a predetermined value (criterion), in other words, if a temperature rise is not greater than the predetermined value, the lining 2d and disc 2a are determined to be in order without locking. If the value (Y-X) obtained as the result of the comparison is greater than the predetermined value, the magnetic brake 2 is determined to be locked, and via the public lines 30, trouble information is transmitted to the supervision center 40 (step S8).

In the first embodiment constructed as described above, the detection of locking of the magnetic brake 2 by the trouble detection unit 20 is achieved by the comparison between the first temperature X and the second temperature Y. As the air temperature of a location at which the elevator is installed equally affects both of the measurement of the first temperature X and the measurement of the second temperature Y, any effect of the air temperature itself on the determination can be ignored. A trouble in the magnetic brake 2 can, therefore, be detected with high accuracy. When the magnetic brake 2 is determined to be locked, trouble information is transmitted to the supervision center 40 so that a prompt countermeasure is feasible. Further, the transmission of the trouble information to the supervision center 40 is performed via the public lines 30 in this embodiment. The public lines 30 can be leased lines or radio communication lines. Where the supervision center 40 or a supervision station is located in the same building, communication lines arranged in the building can be used.

In this embodiment, a magnetic brake system a trouble of which is detectable is constructed of the magnetic brake 2, the control unit 10 and the trouble detection unit 20. The magnetic brake system can, therefore, be used not only as a trouble detection system for an elevator system but also as a trouble detection system for any apparatus which uses the magnetic brake 2. The control unit 10 and the trouble detection unit 20 make up the temperature comparison means and control means in the first and sixth aspects.

In this embodiment, the locking of the magnetic brake was detected by comparing the first temperature X shortly after the brake has been released with the second temperature Y shortly before the brake actuates. Conversely speaking, the magnetic brake can be determined to be locked if the temperature of the magnetic brake has dropped beyond a predetermined value after an elapse of a predetermined time since the actuation of the brake, because such an excessive temperature drop means that the brake produced heat abnormally. This will be described with reference to FIG. 4.

Figure 4:
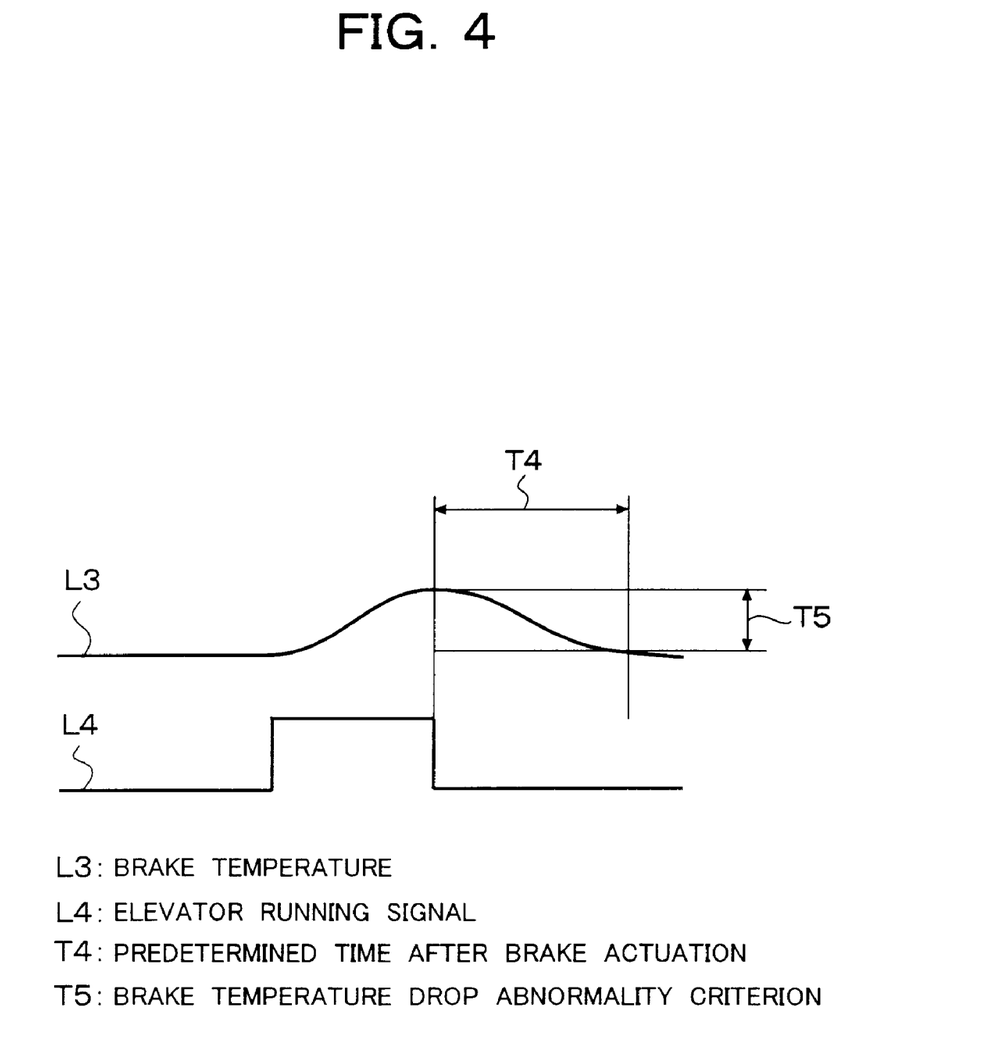
FIG. 4 is a diagram showing temperature variations when the magnetic brake is locked in the first embodiment.

In FIG. 4, there are shown a brake temperature L3, an elevator running signal L4, a predetermined time T4 after brake actuation, and a brake temperature drop abnormality criterion T5.

When the magnetic brake 2 is locked, the brake is in actuation even during running of the elevator (the high level part of L4) so that the brake temperature L3 rises. Therefore, the elevator is caused to stop and, while the predetermined time T4 lapses from the actuation of the brake (after the armature 2c has returned), the brake temperature drops beyond the criterion (T5). The magnetic brake 2 can, therefore, be determined to be locked if a temperature drop is found to have exceeded the predetermined value as a result of a comparison between a first brake temperature after the actuation of the brake (after the armature 2c has returned) and a second brake temperature after an elapse of the predetermined time T4 from the actuation of the brake (after the armature 2c has returned).

Incidentally, no accurate temperature drop is detectable if the elevator runs and stops while the above-described predetermined time T4 elapses. This trouble determination is, therefore, performed when the brake has applied braking force continuously for the predetermined time after the actuation of the brake (after the armature 2c has returned), in other words, while the elevator is stopped.

<Second embodiment>

Figure 5:
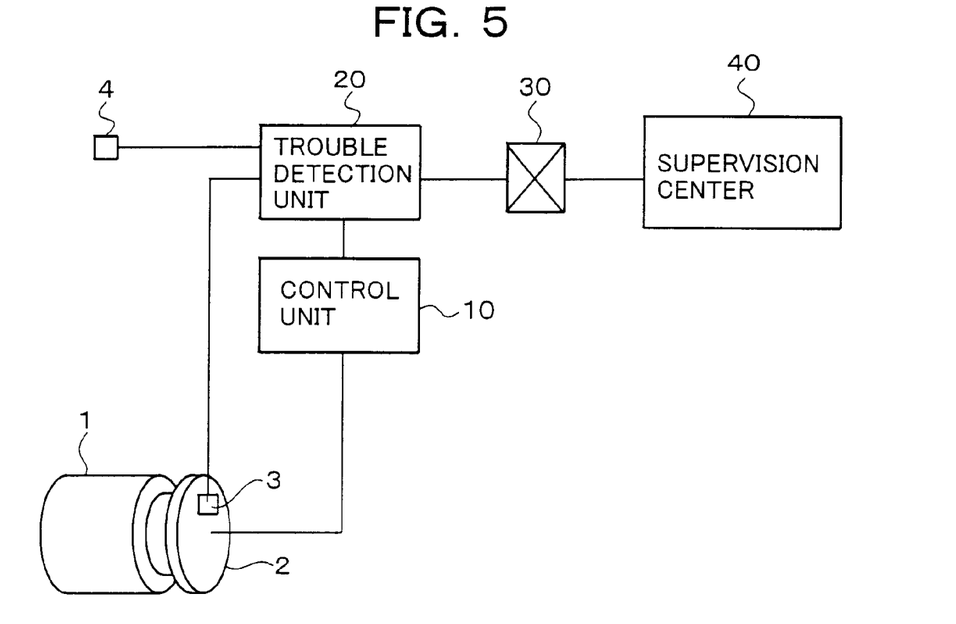
FIG. 5 is a block diagram of an elevator trouble detection system according to a second embodiment of the present invention.
Figure 6:
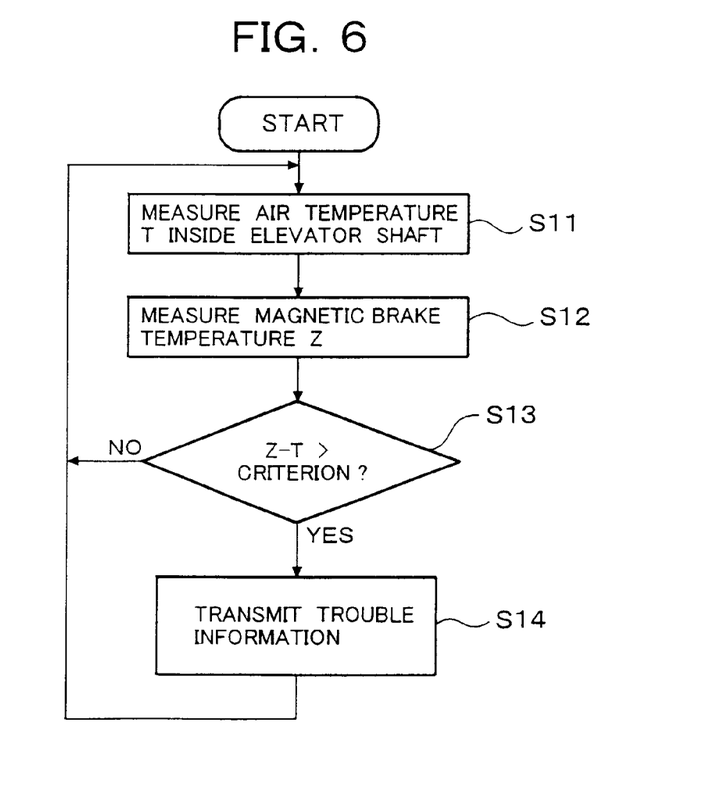
FIG. 6 is a flowchart showing a procedure for the detection of a trouble in the trouble detection system of FIG. 5.

With reference to FIG. 5 and FIG. 6, a description will next be made of the trouble detection system according to the second embodiment of the present invention and an operation procedure of the trouble detection system, respectively.

As illustrated in FIG. 5, a trouble detection unit 20 in the second embodiment is provided with a temperature sensor 3, which is connected to a control unit 10 and serves as a first temperature detection means for measuring a temperature of a magnetic brake 2, and also with an air temperature sensor 4 which is arranged within an elevator shaft and serves as a second temperature detection means for detecting the temperature of air inside the shaft, and the trouble detection unit 20 is connected to a supervision center 40 via public lines 30.

With reference to FIG. 6, a description will next be made about a procedure for the detection of a trouble by the second embodiment. The trouble detection unit 20 measures an air temperature T inside the elevator shaft by means of the air temperature sensor 4, and stores the same (step S11). Further, the trouble detection unit 20 also measures a temperature Z of the magnetic brake 2 by means of the temperature sensor 3, and stores the same (step S12), and the measurement value of the air temperature sensor 4, namely the air temperature T and the measurement value of the temperature sensor 3, namely the temperature Z are compared with each other (step S13). If a value (Z-T) obtained as a result of the comparison is not greater than a predetermined value, the trouble detection unit 20 determines that the lining 2d and the disc 2a are in order without locking. If the value (Z-T) obtained as the result of the comparison is greater than the predetermined value, on the other hand, the magnetic brake 2 is determined to be locked so that via the public lines 30, trouble information is transmitted to the supervision center 40 (step S14).

As the detection of locking of the magnetic brake 2 by the trouble detection unit 20 is performed on the basis of a result of arithmetic on the measurement value of the temperature sensor 3 and that of the air temperature sensor 4 in the second embodiment constructed as described above, variations in temperature can be coped with. It is, therefore, possible to accurately detect a trouble of the magnetic brake 2. If the magnetic brake 2 is determined to be locked, trouble information is transmitted to the supervision center 40, so that a prompt countermeasure is feasible. In the second embodiment, the control unit 10 and the trouble detection unit 20 make up the temperature comparison means and control means in the third and eighth aspects.

Further, a temperature rise due to locking of the magnetic brake takes place only when the elevator is running. A diagnosis of locking can, therefore, be performed efficiently at an appropriate timing provided that the first temperature is detected only while the magnetic brake is released and then, is compared with the second temperature to determine by the control means whether or not the magnetic brake has developed the trouble.

Other elements which have not been described above specifically are constructed like the corresponding elements in the above-described first embodiment, and function likewise.

<Third embodiment>

Referring to FIG. 7 to FIG. 10, a description will hereinafter be made of the elevator trouble detection system according to the third embodiment and an operation procedure of the trouble detection system.

Figure 7:
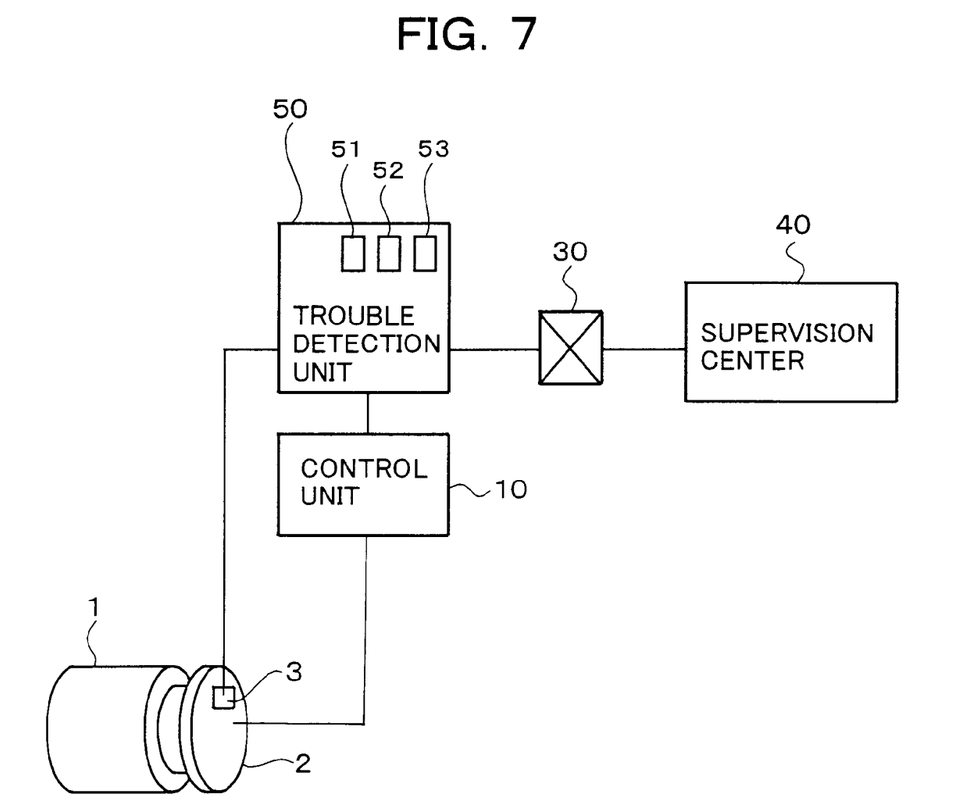
FIG. 7 is a block diagram of an elevator trouble detection system according to a third embodiment of the present invention.

As shown in FIG. 7, a trouble detection unit 50 in the third embodiment is provided with a temperature sensor 3, which is connected to a control unit 10 and serves as a temperature detection means for detecting a temperature of a magnetic brake 2. The trouble detection unit 50 is connected to a supervision center 40 via public lines 30. The temperature sensor 3 is mounted on any one of components of the magnetic brake 2, for example, on the lining 2d depicted in FIG. 2, and measures the temperature of the magnetic brake 2 at predetermined intervals during a period of at least one day. The trouble detection unit 50 is provided with a memory unit 51 for storing temperature data measured by the temperature sensor 3, a determination unit 52 for determining whether or not the magnetic brake 2 has developed a trouble, and a setting unit 53 for calculating an average daily temperature rise during a predetermined period of time, for example, over one month from the difference between a highest temperature and lowest temperature of the magnetic brake 2 and setting the average daily temperature rise as a predetermined criterion. Further, the trouble detection unit 50 receives elevator operation signals from the control unit 10 to monitor for an elevator trouble or a sign of the trouble, and in accordance with details of the trouble, the details of the trouble are reported to the supervision center 40 via the public lines 30.

The memory unit 51 is constructed as a ring buffer with a capacity sufficient to store one day's temperature data. Temperature data are each updated upon elapsed time of 1 day. Because of the limited capacity, temperature data read from the temperature sensor 3 are not recorded in their entirety but are recorded periodically. Further, the capacity of the memory unit 51 also has a capacity sufficient to store over one month the difference between the highest value and the lowest value in the temperature of the magnetic brake 2 during each day.

Figure 8:
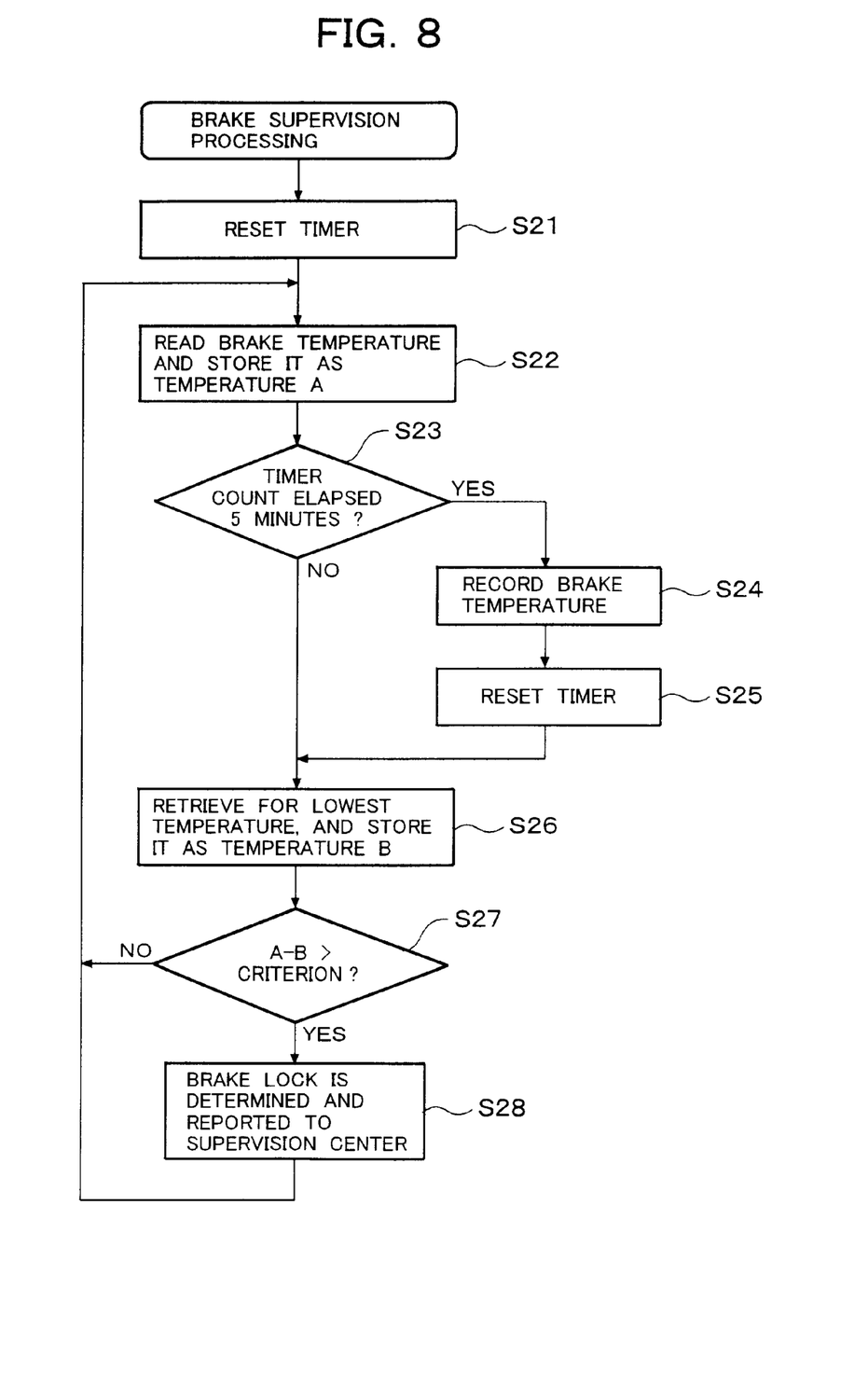
FIG. 8 is a flow chart showing a procedure for detecting a trouble in a magnetic brake by the elevator trouble detection system according to the third embodiment.

The trouble detection unit 50 in this third embodiment is constructed such that a trouble in the magnetic brake 2 can be detected on the basis of a temperature rise from the lowest temperature as detected in accordance with the processing procedure shown in FIG. 8. According to this processing, a recording-cycle measuring timer (not shown) is firstly reset by the trouble detection unit 50 (step S21), and from the temperature sensor 3, the temperature of the magnetic brake 2 is read and stored (step S22). A count value of the timer which was reset in step S21 is then read to determine whether or not the predetermined recording cycle, for example, the elapsed time is 5 minutes (step S23). If the count value of the timer is determined to be the predetermined recording cycle at which temperature data are recorded in the memory unit 51, the temperature of the magnetic brake 2 as stored in step S22 is stored in the memory unit 51 (step S24). The timer is reset (step S25), and from the one day's temperature data of the magnetic brake 2 as stored in the memory unit 51, the daily lowest temperature is retrieved and stored (step S26). If the count value of the timer is not determined to be the predetermined recording cycle (step S23), on the other hand, steps S24 and S25 are skipped and the processing of step S26 is performed to retrieve and store the daily lowest temperature as mentioned above.

The current temperature of the magnetic brake 2, which was stored in step S22, is then compared with the daily lowest temperature stored in step S26 (step S27). If the temperature difference is greater than a predetermined value (criterion), the determination unit 52 determines that the magnetic brake 2 is locked, and informs it to the supervision center 40 via the public lines 30 (step S28).

Figure 9:
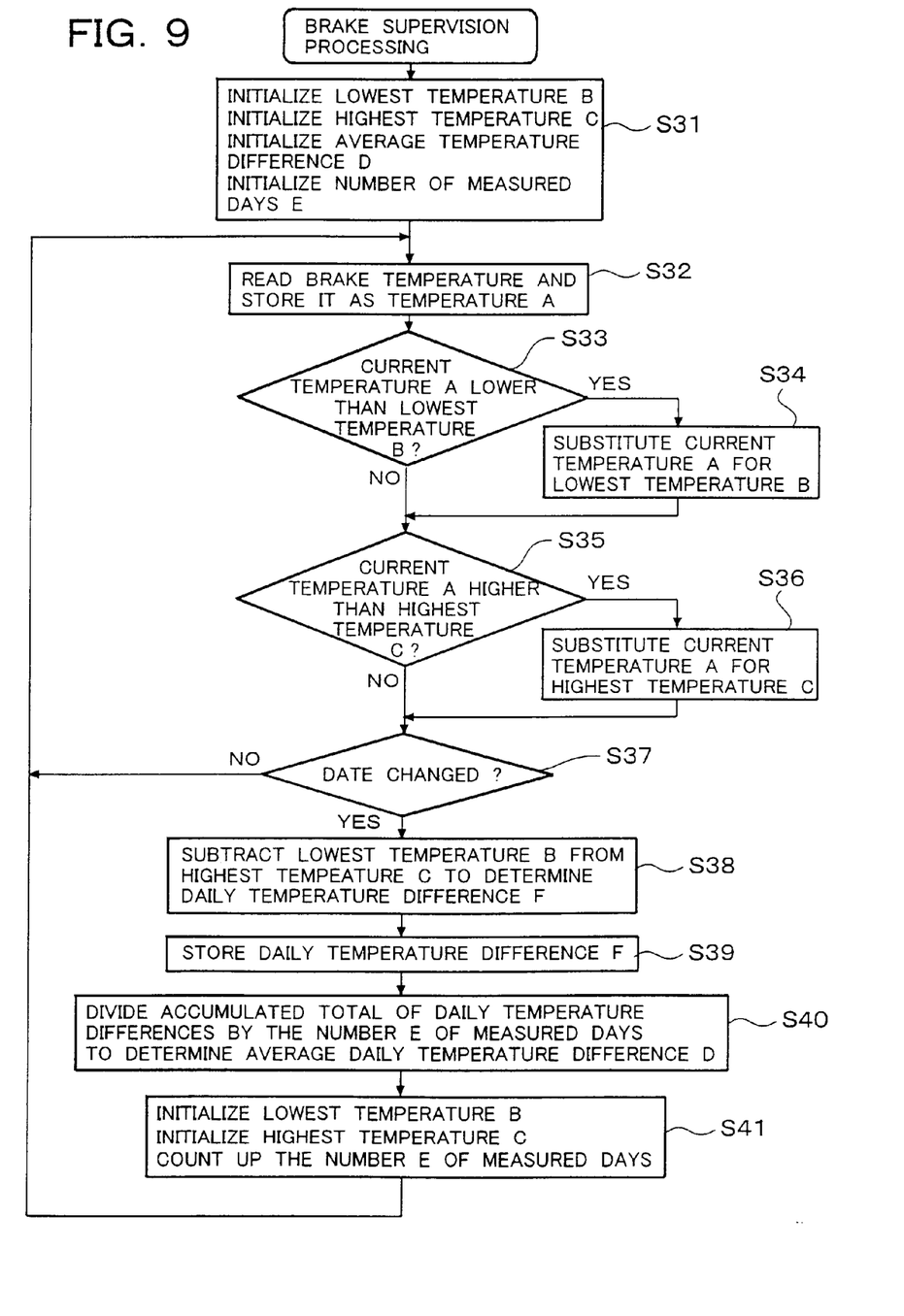
FIG. 9 is a flow chart showing a procedure for setting an average daily temperature increase as a criterion by the elevator trouble detection system according to the third embodiment.

Further, the trouble detection unit 50 in this third embodiment also sets a daily average temperature rise of the magnetic brake 2 as a criterion in accordance with the processing procedure depicted in FIG. 9. Firstly, data areas of the trouble detection unit 50, said data areas being for a lowest temperature B, a highest temperature C, an average temperature difference D and the number E of measured days to be stored in their corresponding processings, are initialized (step S31). The temperature A of the magnetic brake 2 is read from the temperature sensor 3 and is stored (step S32), and the lowest temperature B stored until that time and the current temperature A of the magnetic brake 2, which has been newly read and stored in step S32, are compared (step S33). If the temperature A is found to be higher than the lowest temperature B by the comparison ("N" in step S33), the lowest temperature B is retained as is. If the temperature A is found to be lower than the lowest temperature B ("Y" in step S33), the newly read, current temperature A is caused to substitute for the lowest temperature B (step S34), and the stored highest temperature C and the current temperature A newly read and stored in step S32 are compared with each other (step S35).

If the current temperature A is found to be higher than the highest temperature C as a result of the comparison in step S35 ("Y" in step S35), the newly read, current temperature A is caused to substitute for the highest temperature C (step S36). If the current temperature A is found to be lower than the highest temperature C in step S35 ("N" in step S35), a date data is read by the trouble detection unit 50 (step S37). If the date has not been updated, the routine returns to step S32. If the date has been updated, the temperature difference F between the highest temperature C and the lowest temperature B in the day is determined (step S38), and the daily temperature difference F is stored in the memory unit 51 (step S39). By determining the accumulated total of daily temperature differences F stored in the memory unit 51 and dividing it with the number E of measured days, an average daily temperature difference (average temperature rise) D during the measurement period is determined (step S40). This average daily temperature difference D is set as a predetermined value (criterion) by the setting unit 53. Further, the date is updated, the above-described average temperature difference D is determined, the data areas for the lowest temperature B and highest temperature C are each initialized, and the number E of measured days is counted up (step S41). The routine then returns to step S32, and the processings of step S32 onwards are repeated.

Figure 10:
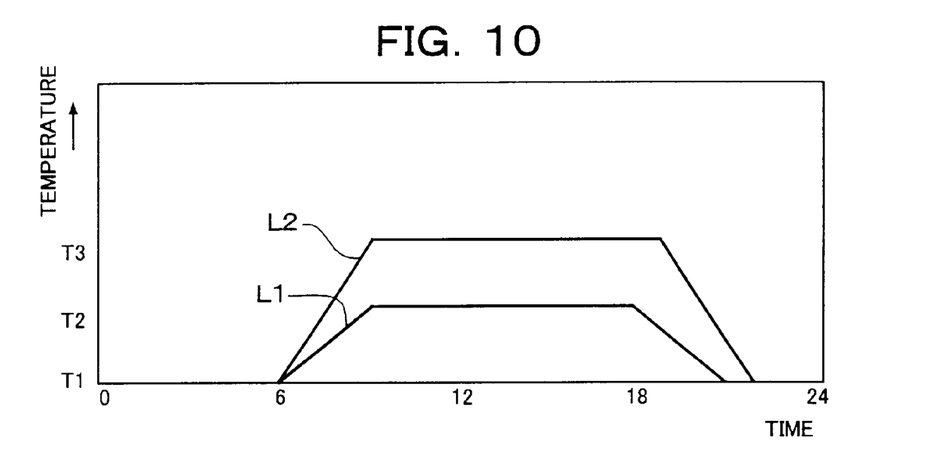
FIG. 10 is a characteristic diagram illustrating temperature increases of a magnetic brake.

According to the third embodiment constructed as described above, the existence or non-existence of a trouble in the magnetic brake 2 is determined using such temperature variation characteristics as shown in FIG. 10. FIG. 10 is a diagram showing an example of daily temperature variation characteristics of the magnetic brake 2. A line L1 indicates temperature variations at a normal time, while a line L2 indicates temperature variations at the time of occurrence of a trouble. As understood from this characteristic diagram, the temperature of the magnetic brake 2 at the normal time varies from the lowest temperature T1 to the highest temperature T2 as indicated by the line L1 in FIG. 10 as a result of a rise in the air temperature and a temperature rise due to heat transferred from the motor 1. When the magnetic brake 2 is locked, on the other hand, the temperature of the magnetic brake 2 varies by frictional heat from the lowest temperature T1 to the highest temperature T3 as indicated by the other line L2. By obtaining the temperature rise of the magnetic brake 2 from the lowest temperature T1 and, when this temperature rise has exceeded the predetermined value (criterion), determining that the operation of the magnetic brake 2 is in a troubled state, a trouble such as locking of the magnetic brake 2 can be accurately determined without being affected by the geographical location, the season and the elevator operation rate.

According to the trouble detection system of the third embodiment, the average daily temperature rise is calculated from the difference between the highest temperature and the lowest temperature of the magnetic brake 2 in each day. From measurement data during operation of the elevator over 1 month, the temperature difference F of the magnetic brake 2, said temperature difference being a temperature rise in a day, is determined specifically for the installation site while taking into consideration the operation rate of the elevator and temperature variations caused by changes in the air temperature. Using this temperature difference F as a criterion, a trouble in the magnetic brake 2 is detected. It is, therefore, possible to automatically set a criterion in conformity with the actual installation site.

In the above-described embodiment, the temperature sensor 3 for measuring the temperature of the magnetic brake 2 is mounted on the lining 2d. The temperature sensor 3 can, however, be arranged at any part of the magnetic brake 2 insofar as heat produced by a contact between the lining 2d and the disc 2a is transferred to that part. This also applies likewise to the first and second embodiments.

In this embodiment, the trouble detection unit 50, including the memory unit 51, the determination unit 52 and the setting unit 53, and the control unit 10 makes up the memory means and control means in the ninth and tenth aspects.

Other elements which have not been described specifically are constructed like the corresponding elements in the above-described first embodiment.

<Fourth embodiment>

Figure 11:
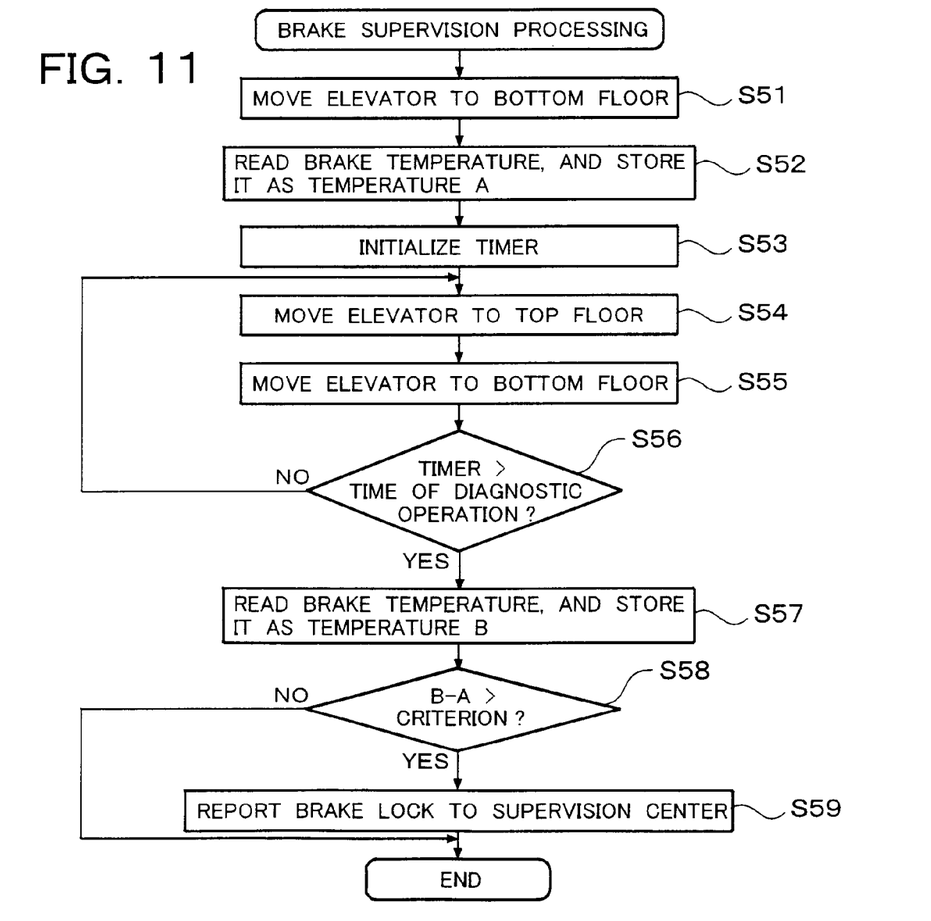
FIG. 11 is a flow chart illustrating a procedure for the detection of a trouble in a magnetic brake of an elevator by the elevator trouble detection system according to the fourth embodiment.

Referring to FIG. 11, a description will next be made of the procedure of brake supervision processing of the elevator trouble detection system according to the fourth embodiment of the present invention. The elevator trouble detection system and magnetic brake according to this embodiment are also constructed like the elevator trouble detection system and magnetic brake according to the first embodiment shown in FIG. 1 and FIG. 2.

In the brake supervision processing of the elevator trouble detection system according to the fourth embodiment, the trouble detection unit 20, as illustrated in FIG. 11, delivers a signal, which causes the elevator to move to the bottom floor, to the control unit 10 to have the elevator moved to the bottom floor (step S51). The temperature of the magnetic brake 2 is measured by the temperature sensor 3, and the temperature is stored as a first temperature A in the memory unit inside the trouble detection system 20 (step S52). The timer is then initialized (step S53). Further, a signal which causes the car to move to the top floor is delivered to the control unit 10 to have the elevator moved to the top floor (step S54), a signal which causes the elevator to move to the bottom floor is delivered to the control unit 10 to have the elevator moved to the bottom floor (step S55), and then, a timer count and a time of diagnostic operation of the magnetic brake are compared with each other (step S56). If the timer count is not found to have reached the time of the diagnostic operation as a result of this comparison ("N" in step S56), the routine returns to step S54 and the processings of step S54 onwards are performed. If the timer count is found to have exceeded the time of the diagnostic operation on the other hand, on the other hand ("Y" in step S56), the temperature of the magnetic brake 2 is measured by the temperature sensor 3, and the thus-measured temperature is stored as a second temperature B in the memory unit inside the trouble detection unit 20 (step S57).

Then, the first temperature A stored in step S52 and the second temperature B stored in step S57 are compared with reach other (step S58). If a value obtained as a result of the comparison is not greater than a predetermined criterion ("N" in step S58), in other words, if the temperature B is not substantially higher than the temperature A, the lining 2d and the disc 2a are determined to be in order without locking, and this processing is ended. If the value obtained as the result of the comparison is greater than the predetermined criterion ("Y" in step S58), the magnetic brake 2 is determined to be locked, and the trouble detection unit 20 transmits trouble information to the supervision center 40 via the public lines 30.

According to the fourth embodiment constructed as described above, the detection of locking of the magnetic brake 2 by the trouble detection unit 20 is performed by the comparison between the first temperature A before the brake diagnosing operation and the second temperature B after the brake diagnosing operation, so that the operation rate of the elevator can be ignored. Accordingly, a trouble in the magnetic brake 2 can be accurately detected irrespective of the operation rate of the elevator. If the magnetic brake 2 is determined to be locked, trouble information is transmitted to the supervision center 40 so that a prompt counter measure is feasible. The term "brake diagnosing operation" as used herein means operation states performed in steps S54, S55 and S56, and means an operation in which the elevator is forcedly operated continuously for a predetermined time between the top floor an the bottom floor.

Other elements which have not been described specifically are constructed like the corresponding elements in the above-mentioned first embodiment, and function likewise.

What is claimed is:

1. A magnetic brake system for performing braking action by cancellation of energization of a coil, said magnetic brake system comprising a magnetic brake provided with a disc connected to a shaft of a motor and also with an armature responsive to energization of said coil for being attracted to separate said disc from a lining, wherein said magnetic brake system comprises:

a temperature detection means for detecting a temperature of said magnetic brake;

a temperature comparison means for comparing a first temperature, which is detected by said temperature detection means shortly after said coil is energized to release said magnetic brake, with a second temperature which is detected by said temperature detection means shortly before said energization of said coil is cancelled to actuate said magnetic brake; and a control means for determining on a basis of results of said comparison by said temperature comparison means whether or not said magnetic brake has developed any trouble.

2. A magnetic brake system for performing braking action by cancellation of energization of a coil, said magnetic brake system comprising a magnetic brake provided with a disc connected to a shaft of a motor and also with an armature responsive to energization of said coil for being attracted to separate said disc from a lining, wherein said magnetic brake system comprises:

a temperature detection means for detecting a temperature of said magnetic brake;

a temperature comparison means for comparing a first temperature, which is detected by said temperature detection means shortly before said energization of said coil is cancelled to actuate said magnetic brake, with a second temperature which is detected by said temperature detection means after a predetermined time is elapsed in continuous actuation of said magnetic brake over said predetermined time since said actuation of said magnetic brake; and a control means for determining on a basis of results of said comparison by said temperature comparison means whether or not said magnetic brake has developed any trouble.

3. A magnetic brake system according to claim 1 wherein, when a temperature difference between said first temperature and said second temperature as determined by said temperature comparison means is greater than a predetermined value, said control means determines that said magnetic brake has developed a trouble.

4. A magnetic brake system according to any one of claims 1 or 2 further comprising an informing means for informing that said magnetic brake has developed said trouble, wherein, when said magnetic brake is determined to have developed said trouble, said control means informs accordingly by said informing means.

* * * * *